US011022489B2

(12) United States Patent
Ng et al.

(10) Patent No.: US 11,022,489 B2
(45) Date of Patent: Jun. 1, 2021

(54) PORTABLE MULTI-SPECTROMETRY SYSTEM FOR CHEMICAL AND BIOLOGICAL SENSING IN ATMOSPHERIC AIR

(71) Applicant: The United States of America, as represented by the Secretary of the Navy, Crane, IN (US)

(72) Inventors: Kin Chiu Ng, Fresno, CA (US); Subrata Sanyal, Eastvale, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/368,171

(22) Filed: Mar. 28, 2019

(65) Prior Publication Data

US 2019/0301931 A1    Oct. 3, 2019

Related U.S. Application Data

(60) Provisional application No. 62/650,599, filed on Mar. 30, 2018.

(51) Int. Cl.
| | |
|---|---|
| *G01J 3/02* | (2006.01) |
| *H01J 49/26* | (2006.01) |
| *G01N 21/65* | (2006.01) |
| *G01N 21/31* | (2006.01) |
| *G01N 21/3504* | (2014.01) |
| *G01J 3/44* | (2006.01) |
| *G01J 3/42* | (2006.01) |
| *G01N 21/64* | (2006.01) |

(52) U.S. Cl.
CPC .......... *G01J 3/0294* (2013.01); *G01J 3/0272* (2013.01); *G01J 3/42* (2013.01); *G01J 3/4406* (2013.01); *G01J 3/4412* (2013.01); *G01N 21/3103* (2013.01); *G01N 21/3504* (2013.01); *G01N 21/6404* (2013.01); *G01N 21/65* (2013.01); *H01J 49/26* (2013.01)

(58) Field of Classification Search
CPC .................................................. G01J 3/0294
USPC ......................................................... 356/72
See application file for complete search history.

(56) References Cited

U.S. PATENT DOCUMENTS

| | | | | |
|---|---|---|---|---|
| 6,184,517 | B1* | 2/2001 | Sawada | G01N 15/0205 250/222.2 |
| 6,429,935 | B1* | 8/2002 | Duan | G01N 21/73 356/316 |
| 7,262,840 | B2* | 8/2007 | Maier | G01N 21/31 250/458.1 |
| 8,094,294 | B2* | 1/2012 | Treado | G01N 21/64 250/339.07 |
| 9,383,260 | B1* | 7/2016 | Yoo | B23K 26/032 |
| 10,222,337 | B1* | 3/2019 | Yoo | G01N 21/718 |

(Continued)

*Primary Examiner* — Tarifur R Chowdhury
*Assistant Examiner* — Omar H Nixon
(74) *Attorney, Agent, or Firm* — Naval Surface Warfare Center, Crane Division; Eric Vanwiltenburg

(57) ABSTRACT

The invention relates to a portable multi-spectrometry system for chemical and biological sensing in atmospheric air. A portable, spectrometric system integrates multiple spectroscopy theories, combines their advantageous features, and fills the gaps for their limitations. The combined spectrometry system with operations for PLS, IRAS, MAS, MFS, RSS, and MS, will detect particles and chemicals, directly and sequentially, in the same air-stream.

9 Claims, 8 Drawing Sheets

COMPONENT DESIGN NOT DRAWN TO SCALE: THE LIGHT SCATTERING SPECTROMETER

(56) References Cited

U.S. PATENT DOCUMENTS

| | | | | |
|---|---|---|---|---|
| 10,393,587 B1* | 8/2019 | Yoo | G01N 21/718 | |
| 2003/0155503 A1* | 8/2003 | Murphy | G01N 27/622 | 250/286 |
| 2003/0156283 A1* | 8/2003 | Jung | A61C 19/04 | 356/326 |
| 2004/0027568 A1* | 2/2004 | Maiefski | G01J 3/02 | 356/326 |
| 2005/0231724 A1* | 10/2005 | Jung | A61C 19/04 | 356/419 |
| 2005/0250198 A1* | 11/2005 | Fujimura | G01N 21/55 | 435/287.2 |
| 2007/0086004 A1* | 4/2007 | Maier | G01N 21/6486 | 356/301 |
| 2007/0171412 A1* | 7/2007 | Vannuffelen | G01J 3/0232 | 356/328 |
| 2007/0171413 A1* | 7/2007 | Vannuffelen | G01J 3/10 | 356/328 |
| 2011/0114837 A1* | 5/2011 | Li | G01N 27/622 | 250/286 |
| 2011/0299071 A1* | 12/2011 | Treado | G01N 21/64 | 356/301 |
| 2012/0268739 A1* | 10/2012 | Leigh | G01J 3/02 | 356/326 |
| 2013/0075601 A1* | 3/2013 | Herrero | H01J 43/04 | 250/282 |
| 2013/0293882 A1* | 11/2013 | Dottery | G01J 3/44 | 356/301 |
| 2014/0117223 A1* | 5/2014 | Stott | H01J 49/0459 | 250/282 |

* cited by examiner

PORTABLE MULTI-SPECTROMETRY SYSTEM FOR CHEMICAL AND BIOLOGICAL SENSING IN ATMOSPHERIC AIR

CROSS-REFERENCE TO RELATED APPLICATIONS

The present application claims priority to U.S. Provisional Patent Application Ser. No. 62/650,599, filed Mar. 30, 2018, entitled "PORTABLE MULTI-SPECTROMETRY SYSTEM FOR CHEMICAL AND BIOLOGICAL SENSING IN ATMOSPHERIC AIR," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,500) is assigned to the United States Government and is available for licensing for commercial purposes. Licensing and technical inquiries may be directed to the Technology Transfer Office, Naval Surface Warfare Center Corona Division, email: CRNA_CTO@navy.mil.

FIELD OF THE INVENTION

The invention relates to a portable multi-spectrometry system for chemical and biological sensing in atmospheric air.

BACKGROUND AND SUMMARY OF THE INVENTION

The present invention relates to a systems and methods to directly sample (real-time in the field) atmospheric air, including particles, aerosols, and spores, for potential pollutants and toxins, so results are obtained almost instantaneously; and depending on those results, actions can be taken immediately thereafter.

A variety of portable field-equipment is currently available with the detection technology based primarily on a theory of spectroscopy, electrochemistry, or chemical reactions. The spectroscopy method is preferred because (1) spectrometers are generally robust; (2) portable spectrometry equipment do not use chemicals; and (3) perform detection directly in atmospheric air. The theories portable spectrometers employ have included Particle-Light-Scattering (PLS), Infra-Red Absorption Spectrometry (IRAS), Molecular Absorption Spectrometry (MAS), Molecular Fluorescence Spectrometry (MFS), Raman Scattering Spectrometry (RSS), and Mass Spectrometry (MS). Each spectroscopic theory provides advantageous features as well as limitations in practical air analysis. Most commercially available portable spectrometers are designed and constructed for single-theory operation.

This invention describes a portable, spectrometric system that integrates multiple spectroscopy theories, combines their advantageous features, and fills the gaps for their limitations. The combined spectrometry system with operations for PLS, IRAS, MAS, MFS, RSS, and MS, will detect particles and chemicals, directly and sequentially, in the same air-stream. The results generated and the information provided from the multiple spectrometric detection will be complementary and will greatly increase the accuracy and reliability for the sensing. The design and construction for the system will be modular, that is, each module will contain a particular spectrometric function. The operator may select to assemble the sensing system for any single-function or for multiple-functions with a combination of two or more spectrometric modules.

According to a further illustrative embodiment of the present disclosure, a specific system can be used for biomolecule detection. The detection results will answer questions, such as: if the air contains biologicals or not; what are the biochemical molecular compositions; are there particles or not; if particles, are they biologics or not.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
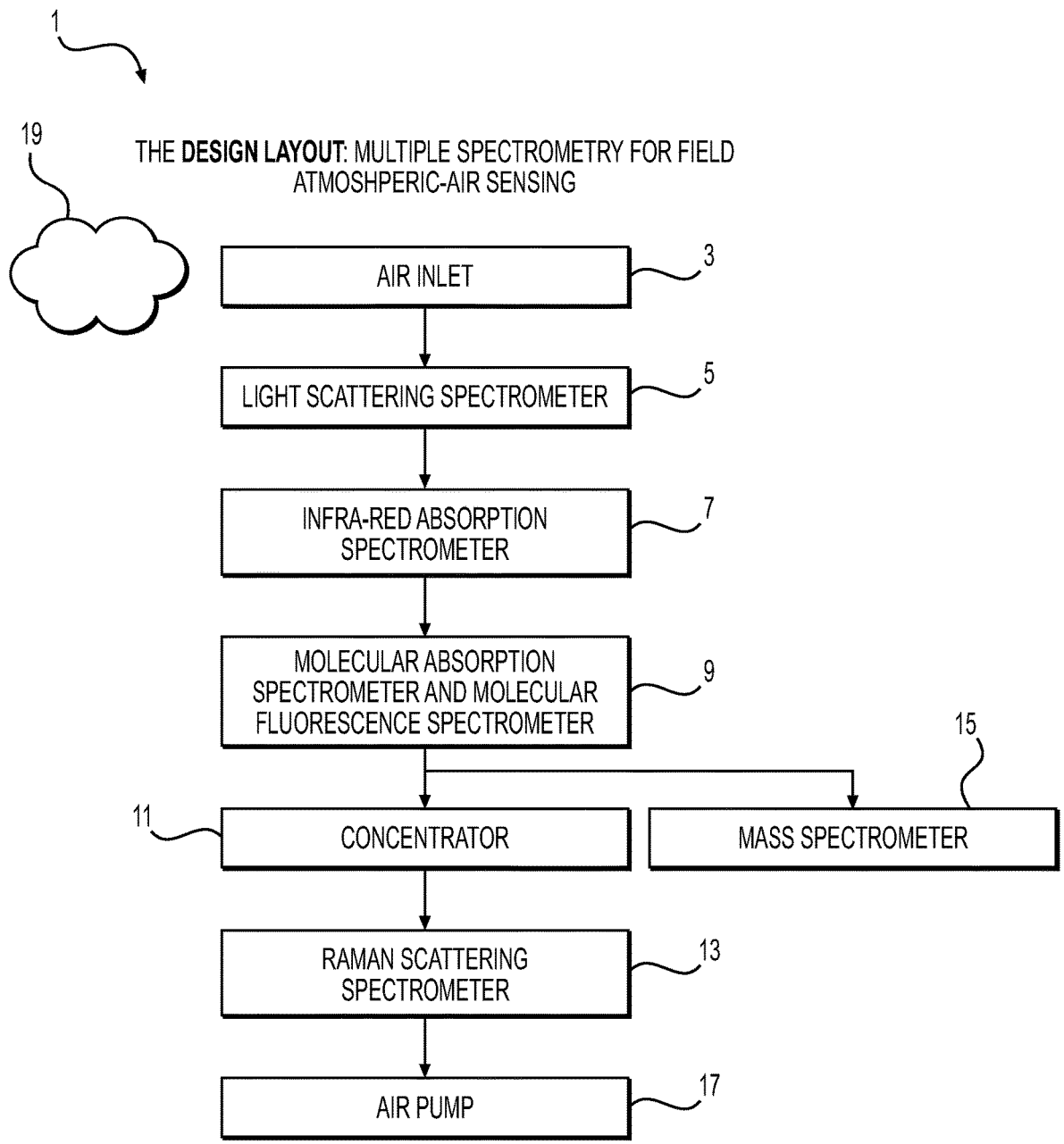
FIG. 1 shows a block diagram of an exemplary design layout of a portable multi-spectrometry system.

FIG. 1 shows a block diagram of an exemplary design layout of a portable multi-spectrometry system 1. Exemplary systems include a plurality of spectrometers placed sequentially such that the spectrometers can test the same testing sample 19. Testing sample 19 enters the system through air inlet 3 and is drawn through the system by air pump 17. The plurality of spectrometers can include a light scattering spectrometer 5, an infrared (IR) absorption spectrometer 7, a combined molecular absorption spectrometer and molecular fluorescence spectrometer 9, a mass spectrometer 15, and a Raman scattering spectrometer 13 connect to a concentrator 11. If selected, light scattering spectrometers 5 should be placed in the first position of the series, and Raman scattering spectrometers 13 should be placed in the last position of the series. Because using a concentrator 11 affects the concentration of molecules in an air sample passing through an exemplary modular system, placing a Raman scattering spectrometer 13 in a position other than last could interfere with readings of subsequent spectrometers. Similarly, including multiple sets of Raman scattering spectrometers 13 and concentrators 11 can result in inaccurate readings of following Raman scattering spectrometers. Other spectrometers types can be placed interchangeably in any position without affecting performance. In some embodiments, multiple spectrometers of the same type can be placed within the series; these embodiments allow an operator to verify accuracy of spectrometers by comparing the results of duplicate spectrometers (e.g., comparing the readings of a first mass spectrometer to a second mass spectrometer).

Figure 2:
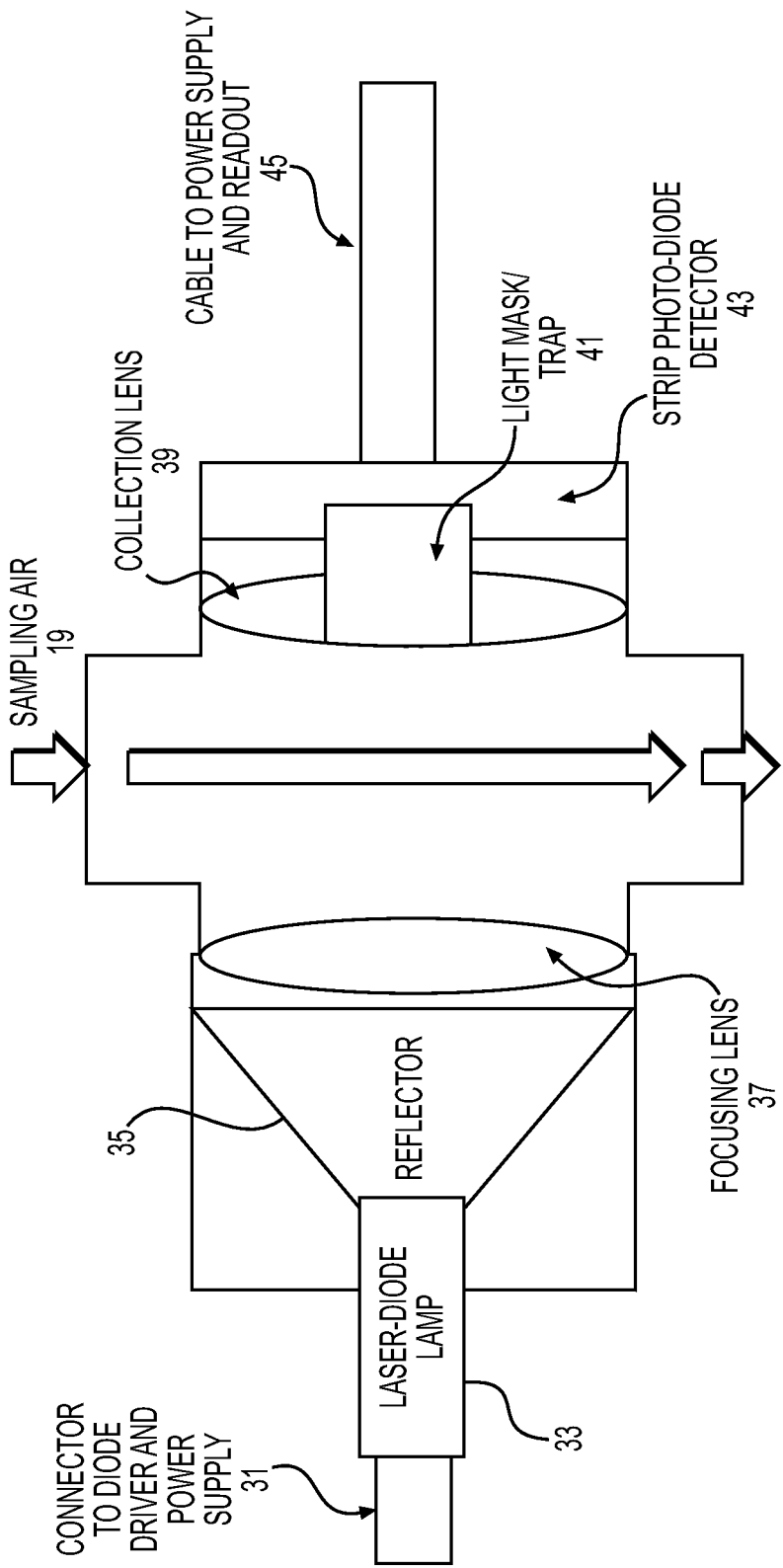
FIG. 2 shows an exemplary light scattering spectrometer.

FIG. 2 shows an exemplary light scattering spectrometer 5. Laser radiation (typically near IR) is generated by a laser-diode lamp 33. The laser radiation is focused to the center of the air stream of sampling 19 by reflector 35 and focusing lens 37; particles in the air-stream scatter the incident laser light to the forward direction; a collection lens 39 gathers the forward scattered light onto a photo-diode detector 43 (e.g., a strip shape that detects the dimensional-imaged radiation effectively). A connector 31 connects laser-diode lamp 33 to a controlling driver and power supply, and cable 45 connects to a power supply transmits detection signals (see FIGS. 8-9). A light mask/trap 41 blocks both the incident laser beam and the central-scattering light. Therefore, the scattering at the larger (higher) angles from a selective smaller-size group particles is detected. Change of the light mask 41 size selects the cut-off size-group (e.g., less than 20 micrometers) for detection. Biological air-particulates have a typical particle size of less than 15 micrometers.

Figure 3:
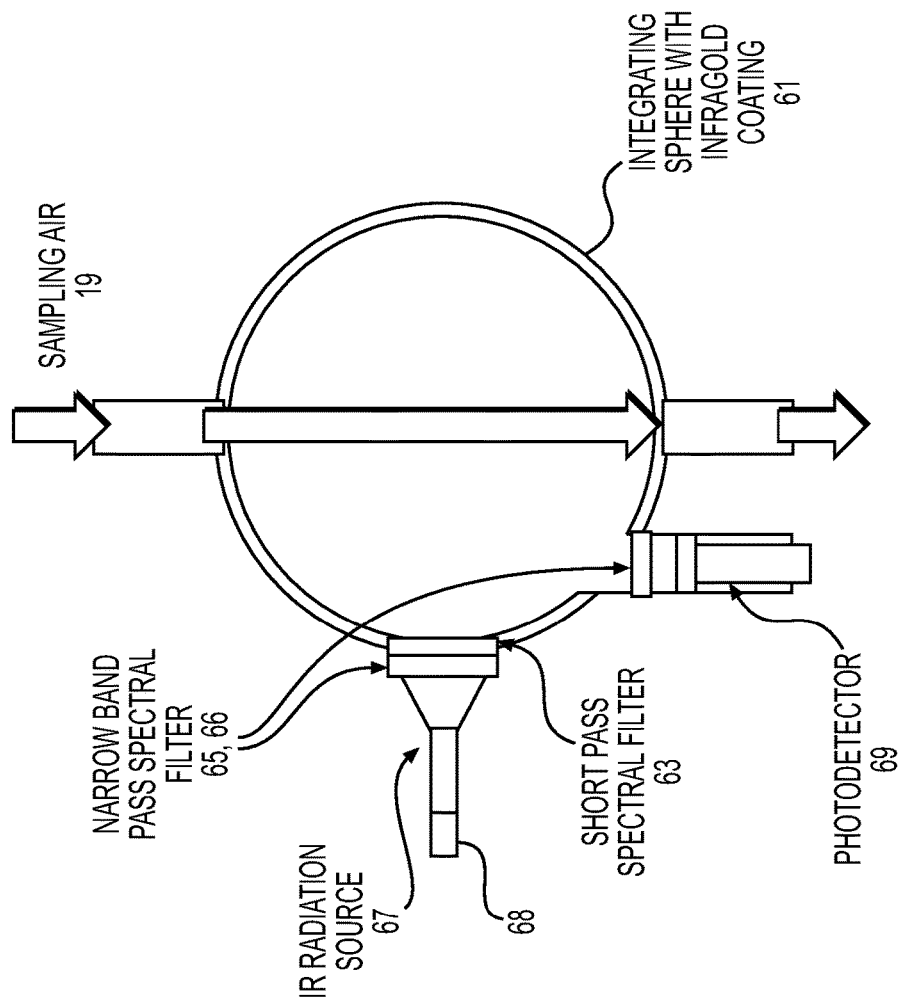
FIG. 3 shows an exemplary infrared absorption spectrometer.
Figure 4:
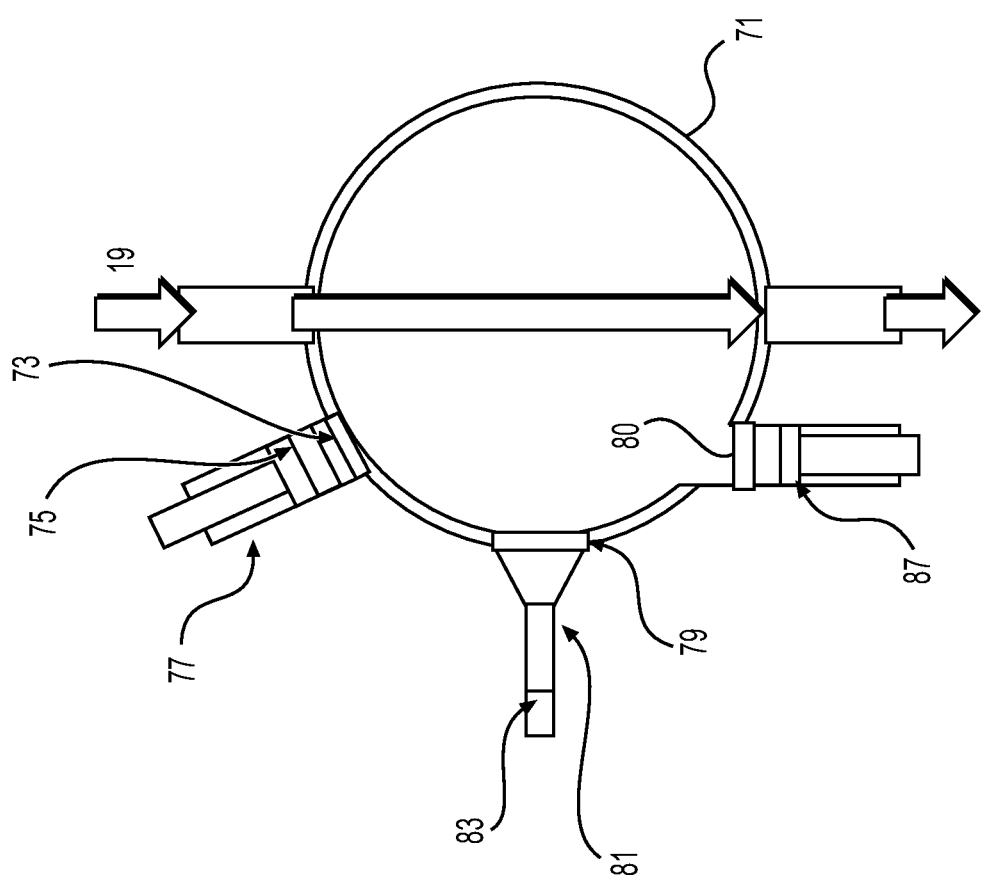
FIG. 4 shows an exemplary simultaneous molecular absorption and molecular fluorescence spectrometer.
Figure 5:
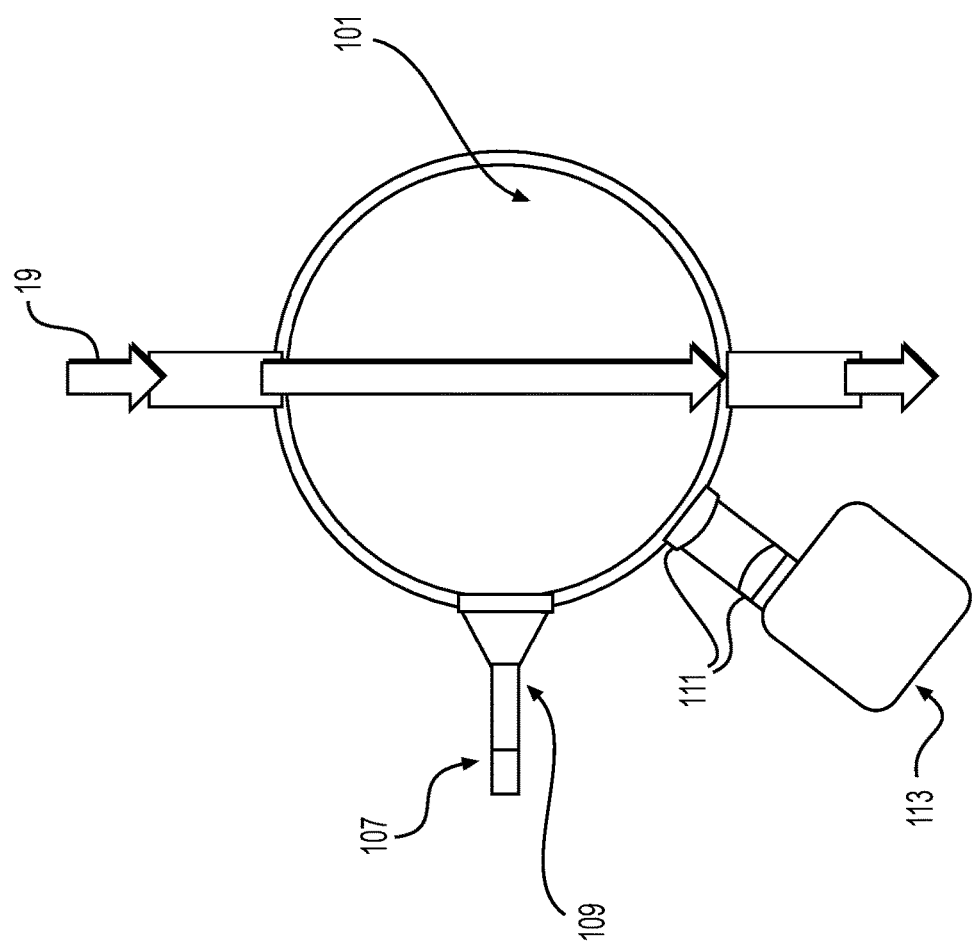
FIG. 5 shows an alternative exemplary simultaneous molecular absorption and molecular fluorescence spectrometer.
Figure 6:
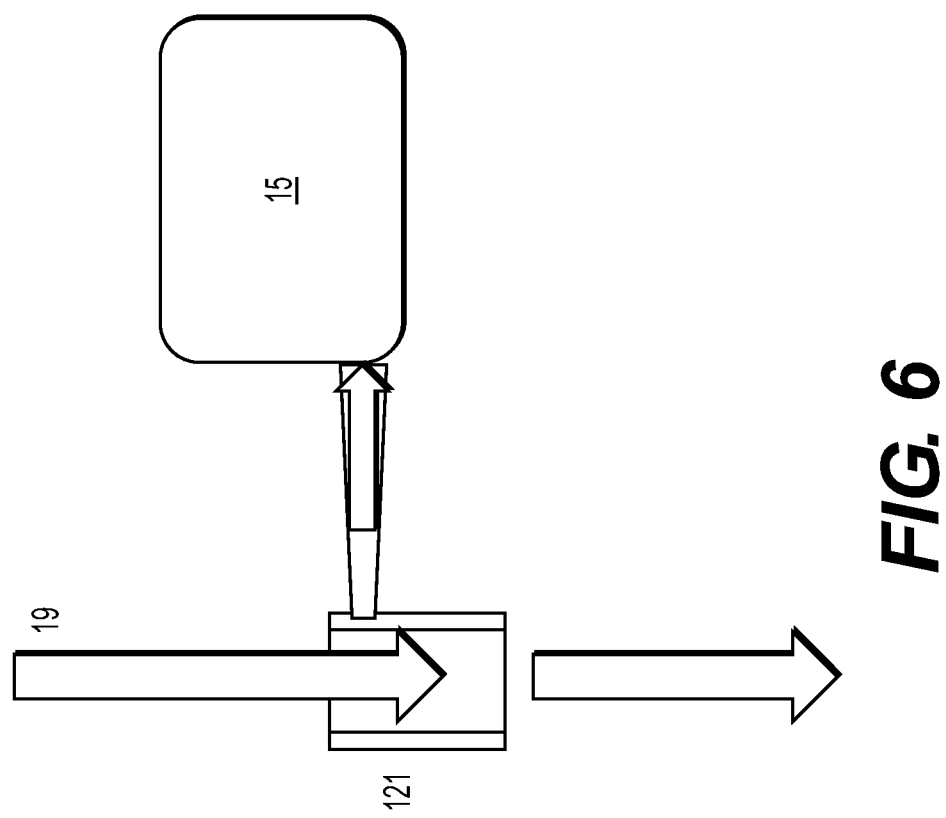
FIG. 6 shows an exemplary mini-mass spectrometer connected to an adaptor.
Figure 7:
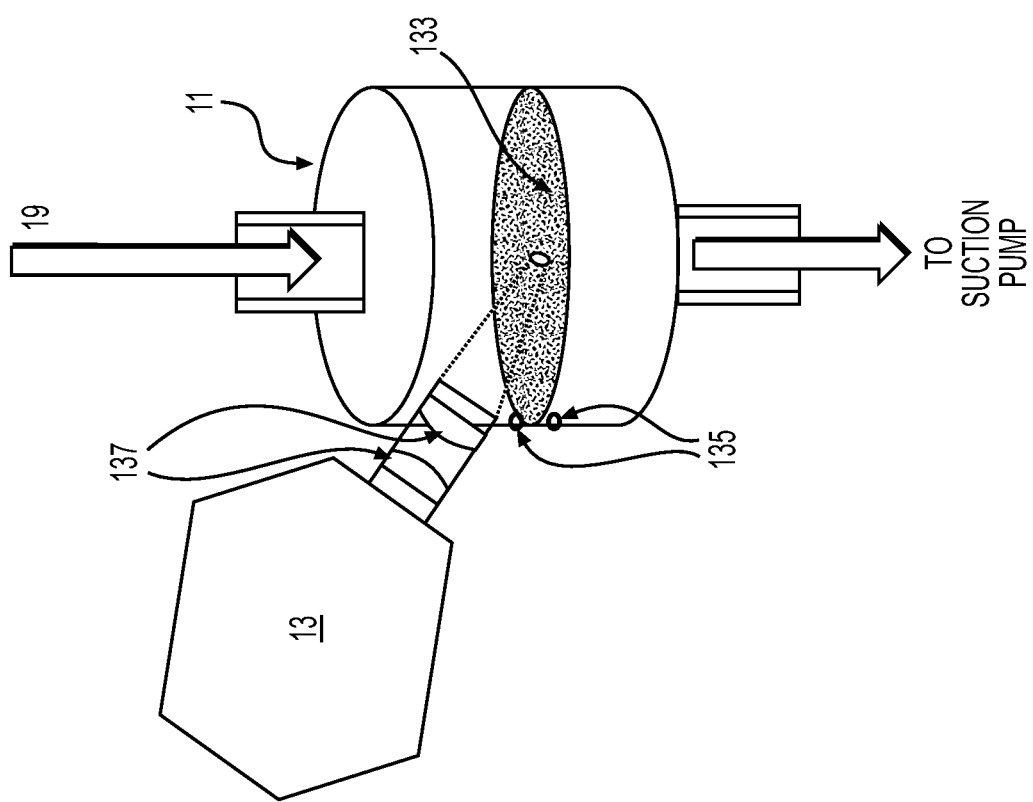
FIG. 7 shows an exemplary Raman scattering spectrometer with concentrator for atmospheric air.

FIG. 3 shows an exemplary infrared absorption spectrometer 7. Because absorption spectrometric measurements in air are often interfered with by particles that scatter away light (the source radiation) from reaching the photo-detector, resulting in a false absorption signal, an optical integrating sphere 61 distributes and multiplies an input radiation homogeneously in the entire volume within the reflective-wall sphere. The use of integrating sphere 61 can prevent this interference because the integrating sphere 61 can enclose all the scattered light within the measurement system. The total light (photons) within the integrating sphere 61 is either absorbed by absorbing substances or reflected by non-absorbing particles in the sampling air 19. A photodetector 69 can sense the diffused Infra-Red radiation from the integrating sphere 61 as reflectance. A lowered reflectance measurement, relative to a blank, indicates absorption. Illustratively, a two to four inch diameter integrating sphere that weighs about one pound may be used. The reflective coating determines the wavelength-range of radiation useful with a sphere. The photodetector 69 is positioned such that it will not directly view the input or the reflected source-radiation (from the opposite wall facing the source). Baffles can be used to shield the source radiation and/or the reflection from sphere-wall, for the detector to sense. Incorporation of baffles will reduce the efficiency of the sphere. The detector-location here is set to minimize viewing of the source radiation and reflection.

The sensing for biomolecules by IR-Absorption Spectrometry can be based on the Amide I band (band center 6060 nm) and/or Amide II band detection. A spectral narrow band-pass filter can select suitably centered wavelength of 6180 nm that includes ~6060 nm to pass through, blocking over wavelengths between 400~11,000 nm. The IR radiation source 67 provides approximately 1000 to 20,000 nm wavelength-range and that the ~6180 nm band wavelengths along with 11,000-20,000 nm wavelengths pass through a first spectral narrow band filter 65. A spectral short-pass filter 63 will allow only the ~6180 nm band wavelengths to pass but will block the 11000-20,000 nm wavelengths. Therefore, only the ~6180 nm band wavelengths which are the source radiation of interest for the IR Spectrometry for Bio-sensing. A second spectral narrow band filter 66 can be placed before photodetector 69 to further prevent false positive detections caused by light outside of wavelengths of interest. The inside-wall of the integrating sphere must be coated with a reflective surface (e.g., Infragold NIR-MIR Reflectance Coating) for the IR wavelengths of interest, in this example the approximately 6180 nm. The photodetector 69 must be able to sense the wavelengths of interest (~6180 nm). A connector 68 connects IR radiation source 67 to a controlling driver and power supply.

FIG. 4 shows an exemplary simultaneous molecular absorption and molecular fluorescence spectrometer 9. The photodetectors are positioned such that they will not directly view the input or the reflected source-radiation (from the opposite wall facing the source). An integrating sphere 71 is used for the previously described reasons. Baffles may need be used to shield the source radiation and/or the reflection from sphere-wall, for the detectors to sense. Incorporation of baffles will reduce the efficiency of the sphere. In the immediate front of fluorescence photodetector 77 is a spectral filter 75 that allows only the fluorescence radiation of interest to pass through and blocks the source radiation; a plano-convex collecting lens 73 collects a wide angle of fluorescence from the relatively central volume of sphere. In the immediate front of the radiation source 81 and the reflectance photodetector 87 are spectral filters 79, 80, respectively, that allow only the source radiation (wavelength) of interest to pass through and block the fluorescence. Both the reflectance and the fluorescence photodetectors 87, 77 can be large diameter spot avalanche photodiodes. A connector 83 connects radiation source 81 to a controlling driver and power supply.

FIG. 5 shows an alternative exemplary simultaneous molecular absorption and molecular fluorescence spectrometer 9 using a mini-spectrometer for monitoring both reflectance and fluorescence wavelengths. Plano-convex lenses are placed between the integrating sphere and mini-spectrometer. A Laser Diode Emits ~275 nm Radiation, and the mini-spectrometer can monitor both the ~275 nm radiation and fluorescence wavelength of ~345 nm simultaneously.

FIG. 6 shows an exemplary mini-mass spectrometer 15 connected to an adaptor 121. The mini-mass spectrometer 15, operating with reduced internal-pressure, draws some of the air into its ionization section of the mass spectrometer, for subsequent analysis. Biological molecules/toxins have very high molecular weight typically several to many-tens of thousands Daltons mass unit; and that the type of mass spectrometer (MS) most suitable for detection employs a time-of-flight (TOF) separation-sector.

FIG. 7 shows an exemplary Raman scattering spectrometer 13 with concentrator 11. The Raman Effect is very weak and therefore a concentrated sample and a relatively high laser power density for excitation are desired. The mini-Raman-spectrometer 13 is integrated with a laser and optical components such as a notch spectral filter and a dichroic filter that allows the same optical lens-set to be used for laser reaching the sample and for Raman scattering collected back into the spectrometer. A near IR laser (e.g., 830 nm wavelength) can be used for excitation and will minimize or avoid fluorescence from samples. Collection filter or membrane can be used to concentrate the sample by collecting chemicals, aerosols, spores, particles, airborne materials on the filter or membrane. The filter or membrane material can be chosen such that, when it is illuminated with a laser, it will not emit light that could interfere spectrally for the Raman Shift spectral region of interest. O-rings 135 can be used to keep the filter or membrane fit between the top and bottom parts of the concentrator. Lenses 137 between the mini-Raman-spectrometer 13 and concentrator 11 can be used for high light collection. In some exemplary embodiments, multiple Raman spectrometers 13 can be placed around a single concentrator.

Figure 8:
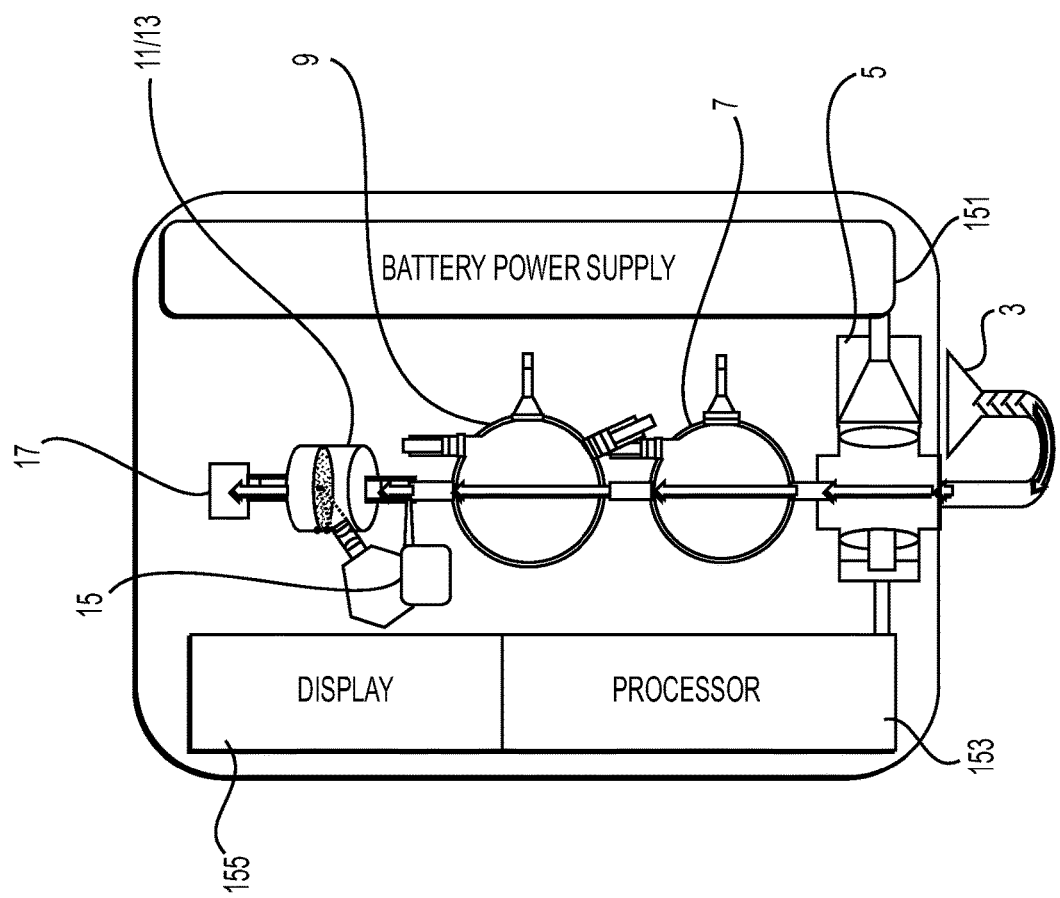
FIG. 8 shows an exemplary assembled modular system.

FIG. 8 shows an exemplary assembled modular system with an air inlet 3, a light scattering spectrometer 5, an infrared absorption spectrometer 7, a spectral filter molecular absorption and spectral filter molecular fluorescence spectrometer 9, a mass spectrometer 15, a Raman scattering spectrometer 13 with a concentrator 11, and an air pump 17. A battery supply 151 can be a centralized unit with one battery. All of the control and signal processing electronics and software can be centralized within a signal processor 153. A display allows the signal processor to show various data and readings. All of the components of the modular system can fit in a system container that is approximately the size of a suitcase, and the entire modular system can weigh less than thirty pounds. The system generates complementary information, providing very high confidence for fast and accurate field-detection in air, and answering the questions: if the air contains biologicals or not; what are the biochemical molecular compositions; are there particles or not; if particles, are they biologics or not. The modular systems may be adapted to unmanned ground or aerial vehicles (e.g., air-drones, etc.) for operations.

In an exemplary method of operation, an exemplary portable multi-spectrometry system can be using in a controlled environment to test air samples having known quantities of molecules. The controlled readings can be used to generate a database of known values. The database of known values can be stored within the portable multi-spectrometry system or an external computer storage medium (e.g., for upload to additional portable multi-spectrometry system units). A portable multi-spectrometry system can compare field readings to the database of known values to determine the presence of biological and chemical molecules.

In an exemplary method of operation, an exemplary portable multi-spectrometry system can be used to test unknown air samples. An unknown air sample enters the system through an air inlet and is drawn through the system by an air pump. The unknown air sample passes through a plurality of spectrometers, wherein each spectrometer generates a reading which is transferred to a processor. The plurality of readings can be analyzed (e.g., manually or automatically) to determine the presence of biological and chemical molecules in the unknown air sample. In exemplary methods, each reading can be compared to each other for consistency. If a particular reading is determined to be incorrect, inconsistent, or unreliable, the corresponding spectrometer can be replaced at the point of use. Because each individual spectrometer is light-weight (e.g., less than 30 pounds), modular, and interchangeable, the spectrometers can be quickly replaced or rearranged.

In an exemplary method of operation, an exemplary portable multi-spectrometry system having testing spectrometers comprising multiple of one type of spectrometer (e.g., three infra-red absorption spectrometers occupying the second, third, and fourth positions) can test a known or unknown sample of air. The readings from the testing spectrometers can be compared to each other to ensure consistency and accuracy of the testing spectrometers. Exemplary methods can use this method to test for active usage (e.g., in a field setting) or test large quantities of spectrometers for future usage (e.g., in a factory or warehouse setting).

Although the invention has been described in detail with reference to certain preferred embodiments, variations and modifications exist within the spirit and scope of the invention as described and defined in the following claims.

The invention claimed is:

1. A multi-spectrometry system comprising:
   an air inlet, wherein a testing sample enters the system;
   a plurality of spectrometers comprising at least three spectrometers, wherein each spectrometer of the at least three spectrometers is a light scattering spectrometer, an infrared absorption spectrometer, a spectral filter molecular absorption and spectral filter molecular fluorescence spectrometer, a mass spectrometer, or a Raman scattering spectrometer coupled to a concentrator, wherein each spectrometer of the at least three spectrometers is a different type of spectrometer; wherein the at least three spectrometers are coupled linearly such the testing sample passes through each spectrometer of the at least three spectrometers sequentially;
   an air outlet, wherein the testing sample exit the system; and
   an air pump, configured to draw the sample through the system.

2. The system of claim 1, wherein the plurality of spectrometers comprises:
   at least one light scattering spectrometer;
   at least one infrared absorption spectrometer;
   at least one spectral filter molecular absorption and spectral filter molecular fluorescence spectrometer;
   at least one mass spectrometer; and
   at least one Raman scattering spectrometer coupled with at least one concentrator.

3. The system of claim 2, wherein the at least one light scattering spectrometer is in a first position closest to the air inlet, wherein the at least one Raman scattering spectrometer is in a last position closest to the air outlet.

4. The system of claim 2, further comprising:
   a processor and a display, wherein each spectrometer of the plurality of spectrometers outputs a plurality of reading signals to the processor, wherein the processor transmits a display signal to the display such that the display shows a result of each spectrometer of the plurality of spectrometers.

5. The system of claim 4, further comprising a power supply, wherein the power supply provide power to the processor, display, and each spectrometer of the plurality of spectrometers.

6. A method of detecting chemical and biological agents comprising:
   providing a multi-spectrometry system comprising:
      an air inlet,
      a plurality of spectrometers comprising at least three spectrometers, wherein each spectrometer of the at least three spectrometers is a light scattering spectrometer, an infrared absorption spectrometer, a spectral filter molecular absorption and spectral filter molecular fluorescence spectrometer, a mass spectrometer, or a Raman scattering spectrometer coupled to a concentrator, wherein each spectrometer of the at least three spectrometers is a different type of spectrometer; wherein the at least three spectrometers are coupled linearly such that the testing sample passes through each spectrometer of the at least three spectrometers sequentially;
an air outlet; and
an air pump;
transporting the multi-spectrometry system to an end use location;
drawing air through the multi-spectrometry system with the air pump such that air passes through each spectrometer of the first plurality of spectrometers.

7. The method of claim 6, further comprising:
at the end use location, selecting and installing a second plurality of spectrometers into the multi-spectrometry system.

8. A method of testing spectrometers comprising:
providing a multi-spectrometry system comprising:
an air inlet,
a first plurality of spectrometers,
an air outlet, and
an air pump,
wherein the plurality of spectrometers comprises at least two of a first type of spectrometer; wherein the first type of spectrometer is a light scattering spectrometer, an infrared absorption spectrometer, a spectral filter molecular absorption and spectral filter molecular fluorescence spectrometer, a mass spectrometer, or a Raman scattering spectrometer coupled to a concentrator, wherein each spectrometer of the at least two spectrometers is a different type of spectrometer; wherein the at least two spectrometers are coupled linearly such that the testing sample passes through each spectrometer of the at least two spectrometers sequentially;
drawing air through the multi-spectrometry system with the air pump such that air passes through each spectrometer of the plurality of spectrometers;
comparing the readings of each of the at least two of the first type of spectrometer.

9. The method of claim 8, further comprising:
if a reading of a first spectrometer of the at least two of the first type of spectrometer is inconsistent with the other spectrometers, replacing the first spectrometer with a second spectrometer of the first type of spectrometer.

* * * * *